March 9, 1965 P. DORNIER 3,172,150
APPARATUS FOR STRETCHING LENGTHS OF THERMOPLASTIC FOIL
MATERIAL IN THE LONGITUDINAL DIRECTION
AND IN THE TRANSVERSE DIRECTION
Filed March 7, 1963 3 Sheets-Sheet 3
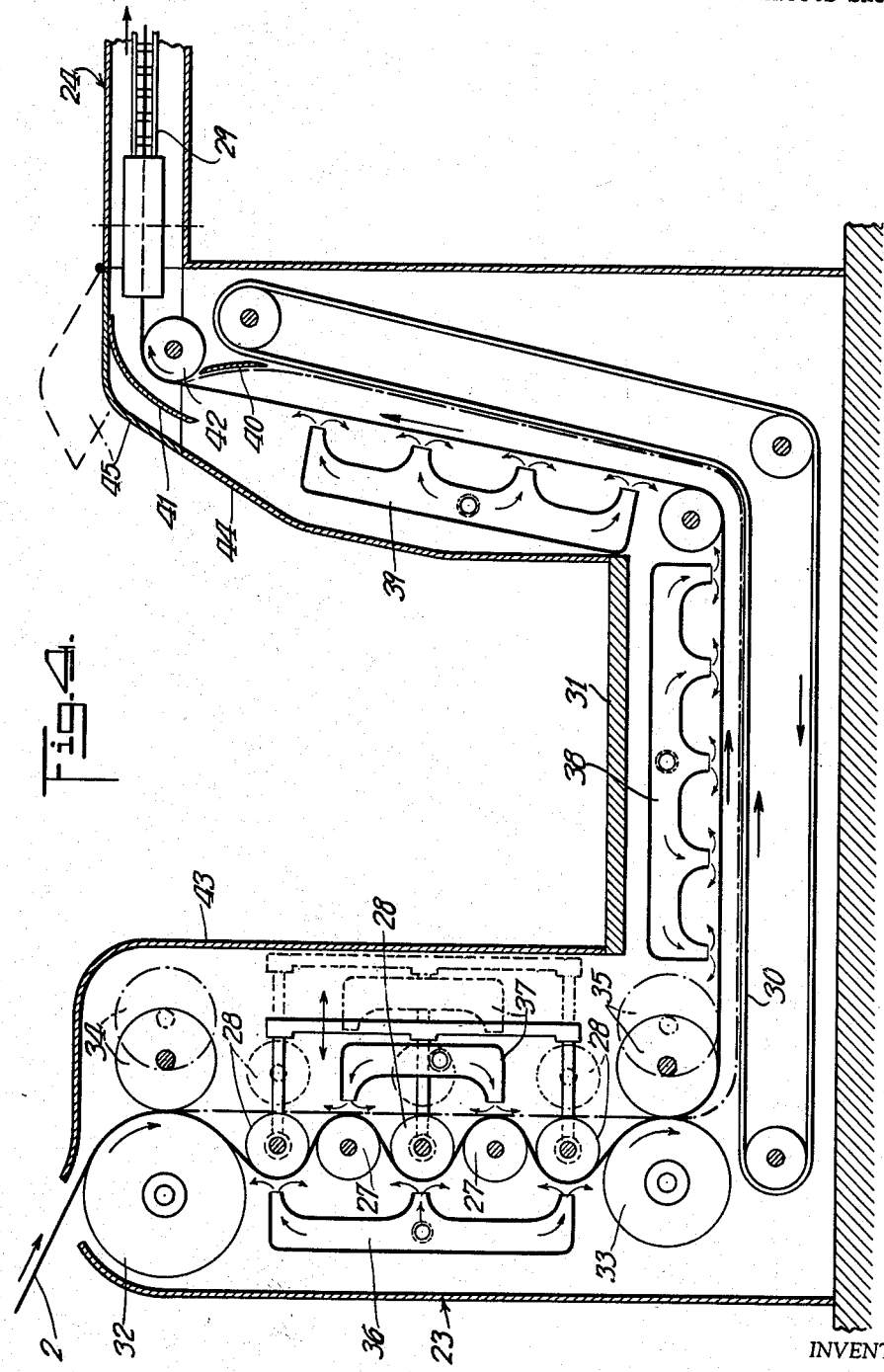
INVENTOR.
PETER DORNIER.
BY
ATTORNEY.

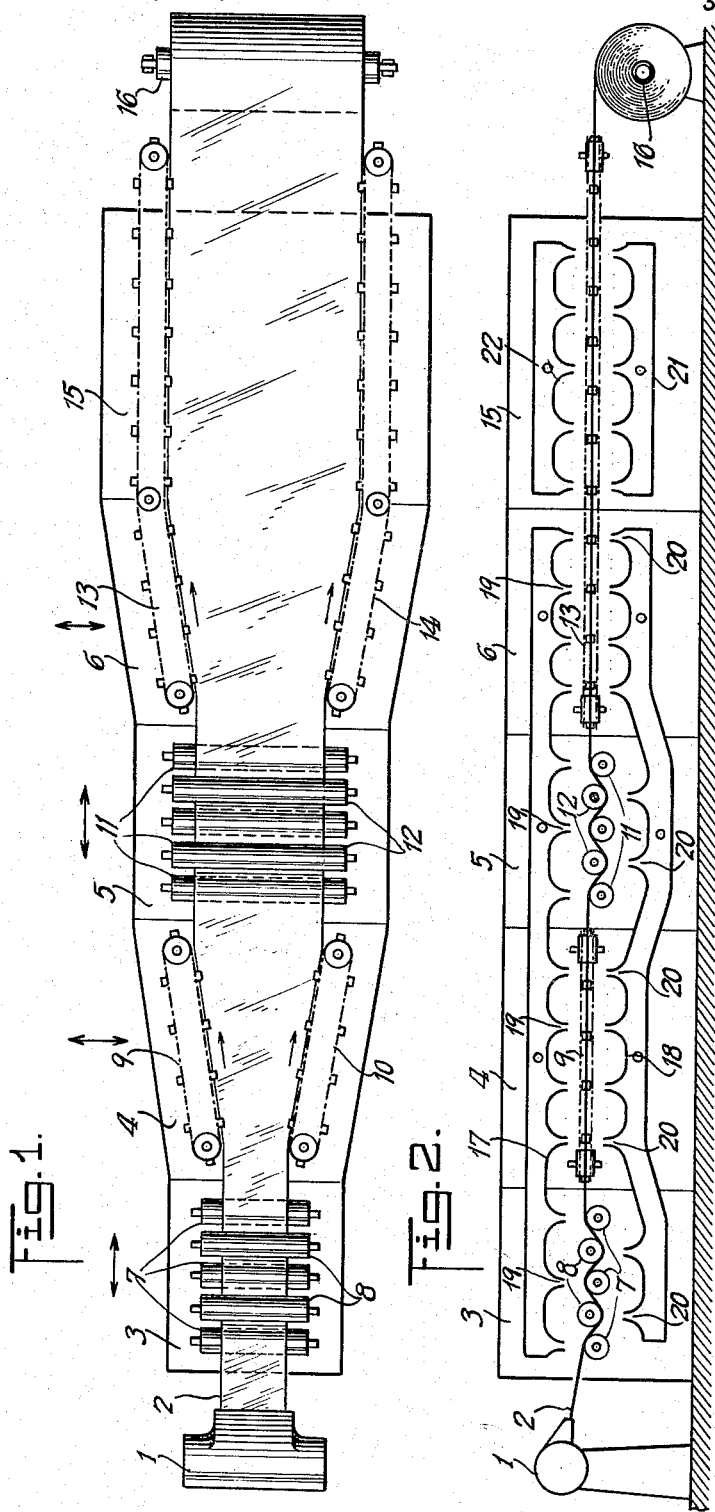

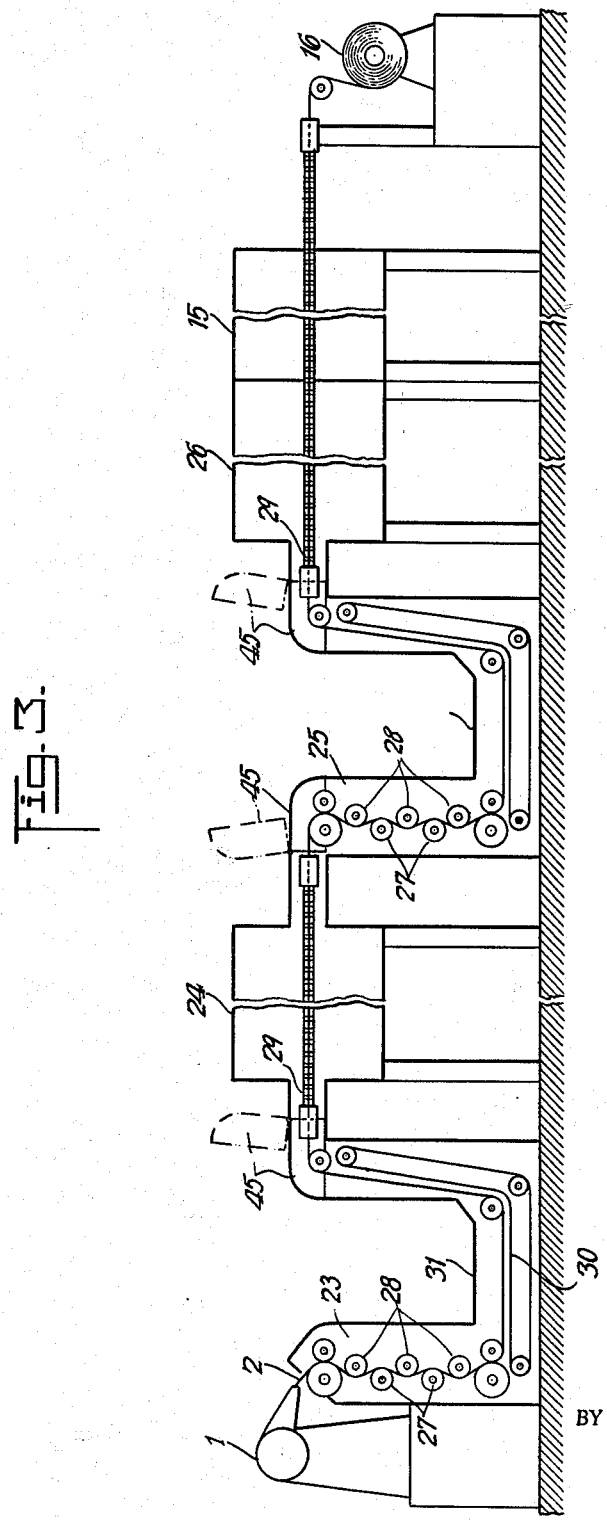

United States Patent Office 3,172,150
Patented Mar. 9, 1965

3,172,150
APPARATUS FOR STRETCHING LENGTHS OF THERMOPLASTIC FOIL MATERIAL IN THE LONGITUDINAL DIRECTION AND IN THE TRANSVERSE DIRECTION
Peter Dornier, Lindau, Germany, assignor to Lindauer Dornier Gesellschaft m.b.H., Lindau, Germany, a firm of Germany
Filed Mar. 7, 1963, Ser. No. 263,476
Claims priority, application Germany, Mar. 17, 1962, L 41,513; May 25, 1962, L 42,063
8 Claims. (Cl. 18—1)

The present invention relates to an apparatus for stretching lengths of thermoplastic synthetic foil material in the longitudinal direction and in the transverse direction in a continuous operation.

When producing lengths of thermoplastic synthetic foil or films, or the like, the foil material is usually stretched to obtain the desired thickness and a desired structure and strength characteristic of the material.

Rolling produces a definite longitudinal stretch of the foil material while lateral or transverse stretching is little and unpredictable. Even repeated rolling reduces the thickness of the material only to a certain degree and not to the thinness which is required for many uses of the foils or films. It is difficult to design and manufacture rolling apparatus which reliably eliminate crushing and wrinkling of the rolled material.

Apparatus have been proposed wherein the material runs in undulating fashion over a plurality of rollers of which the roller or roller group last passed by the material rotates faster than the roller or roller group first passed by the material, for effecting longitudinal stretching only, transverse stretching being accomplished in a separate apparatus using the tenter principle.

Apparatus have been proposed which effect simultaneous stretching of the material in longitudinal and in transverse direction. Such apparatus are complicated and it has not been possible to design a machine which homogeneously and perfectly effects the simultaneous stretching in two directions.

It is an object of the present invention to provide apparatus which produce substantially homogeneous stretching of lengths of thermoplastic synthetic foil material in the longitudinal and in the transverse direction by means of relatively simple devices which operate reliably. The apparatus according to the invention uses conventional devices for longitudinally and transversely stretching the material whereby the desired longitudinal stretching is effected in at least two stages and transverse stretching is also effected in at least two stages which alternate with the stages for longitudinal stretching. The entire apparatus forms a compact, encased unit which affords homogeneous and reliable heating of the foil material while it is stretched. Alternate stretching of the material in the longitudinal direction and in the transverse direction whereby the entire stretching in either direction is done in a plurality of stages considerably improves the structure and homogeneousness of the material. Stretching in either direction and in each stage can be separately and independently controlled to obtain optimal results. Arrangement of all stretching stages in a unitary apparatus facilitates supervision and adjustment and maintenance of optimal temperatures at a minimum of expense.

The last stretching stage is preferably a transverse stretching stage and is combined with a thermal fixing and, if desired, a cooling apparatus so that the material is completely finished in a single and compact machine.

In a preferred embodiment of the invention the longitudinal stretching stages are arranged vertically whereby the foil material moves substantially vertically downward. This reduces the floor space required by the machine. Means are provided for transporting the foil material from the longitudinal to the subsequent transverse stretching stage which is placed at an elevation higher than the outlet of the preceding longitudinal stretching stage. This means preferably includes a horizontal portion at the elevation of the outlet of the vertical stretching stage for taking over the longitudinally stretched foil material therefrom. Above this horizontal portion a platform can be placed for the operator who is in a position to supervise the operation of the longitudinal stretching stage as well as of the subsequent transverse stretching stage. In an apparatus wherein all stretching devices are substantially horizontal an operator must be placed on either side of the machine for controlling the run of the foil material.

An object of the invention is to provide an apparatus for stretching thermoplastic synthetic and like foil material whereby setting up of the apparatus, i.e. insertion of a length of material into the apparatus is greatly facilitated. The rollers of the longitudinal stretching device, which is arranged vertically, are arranged in two groups. The rollers of one group are spaced and their rotation axes are stationary and in a substantially vertical plane. The rollers of the second group which are also spaced and have rotation axes arranged in a substantially vertical plane are laterally movable, whereby they can be placed away from the rollers of the first group for providing a vertical passage between the two roller groups affording dropping of the foil material therethrough when setting up the machine. Thereupon the rollers of the second group are laterally moved toward and placed between the rollers of the first group, for normal operation of the machine.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a diagrammatic plan view of an apparatus according to the invention.

FIG. 2 is a part sectional side elevation of the apparatus shown in FIG. 1.

FIG. 3 is a part sectional diagrammatic side elevation of a modified apparatus according to the invention.

FIG. 4 is a large scale diagrammatic sectional side elevation of a portion of the apparatus shown in FIG. 3.

FIGS. 1 and 2 diagrammatically illustrate a stretching apparatus wherein a continuous sheet of thermoplastic material is stretched longitudinally and transversely. The material issues, for example, from a conventional extruder 1 and enters the machine in the form of a foil 2. The foil passes first through a device 3 wherein the foil is longitudinally stretched. Thereupon the foil passes through a device 4 wherein the foil is transversely stretched. The foil emerging from the device 4 passes through a second longitudinal stretching device 5 whereupon the material is once more transversely stretched in a device 6. Longitudinal and transverse stretching is done alternately and stretching in each direction is effected in two stages. Stretching in either direction may be done alternately in more than two stages. The arrows in FIG. 1 indicate the direction of stretching.

The longitudinal stretching device 3 comprises a plurality of parallel rollers. There is a lower group of rollers 7 and an upper group of rollers 8. The elevation of the rollers of one of the groups, preferably of the upper group, is adjustable to facilitate initial insertion of the foil. When the machine is ready for normal operation the rollers of the group 8, if this group is adjustable, are lowered into the position shown in FIG. 2. At least two rollers, for example the first and the last one passed by the foil, are positively driven, the first of the driven rollers being rotated at a lower speed than the last of the driven rollers for obtaining the desired stretching effect. This is conventional and no means for driving the rollers are shown.

In the transverse stretching device 4 the longitudinal edges of the foil material are gripped in the conventional manner by clips mounted on endless chains 9 and 10, for example, as shown in the patent application of Fritz Gageur, Serial No. 235,212, filed November 5, 1962. The distance between the chains 9 and 10 increases in the travel direction of the foil for producing the desired transverse stretching effect.

The structure of the second longitudinal stretching device 5 corresponds to the structure of the longitudinal stretching device 3. The rollers 11 and 12 of the device 5 are, of course, longer than the rollers 7 and 8 of the first longitudinal stretching device. The second transverse stretching device 6 is constructed similarly to the transverse stretching device 4 and has endless clip chains 13 and 14. It is of advantage to provide a transverse stretching stage as the last stage of the stretching machine, because in that case a thermal fixing field 15 can be conveniently connected to the last transverse stretching stage. The clip chains 13 and 14 extend not only alongside the foil material passing through the device or stage 6 but also alongside the foil material passing through the thermal fixing stage 15. A cooling stage, not shown, may be placed adjacent to the stage 15 for receiving the foil material directly therefrom. The finished material leaving the machine is wound on a roller 16.

The compact structure of the machine makes it possible to continuously heat-treat the foil while passing through the stretching stages. In the example shown in FIG. 2 ducts 17 and 18 are placed on either side of the foil and are provided with nozzles 19 and 20, respectively, for blowing heated air onto the foil. The ducts 17 and 18 may extend throughout all stretching stages so that heating of the foil is uniformly effected. In the thermal fixing stage 15 the foil material is heated to a temperature different from that in the stretching stages and a separate heating arrangement is provided comprising a lower duct 21 and an upper duct 22 provided with outlet nozzles similar to the nozzles 19 and 20 of the ducts 17 and 18, respectively. Of course, different types of heating means may be provided; for example, the rollers of the longitudinal stretching stages may be internally heated and heated platens may be provided on either side of and parallel to the foil material in the transverse stretching stages.

It is not absolutely necessary that the heating devices of the individual stretching stages are continuously connected, as shown in FIG. 2; separate heating devices may be provided in the individual stages and the foil may still be satisfactorily heated, because, due to the compact arrangement of the machine, no appreciable heat loss takes place and the foil is continuously heated while passing through the machine. The subdivision of the entire stretching operation into a plurality of stages whereby longitudinal stretching alternates with transverse stretching affords obtaining a foil structure which is practically the same as the structure of a foil which has been stretched simultaneously in the longitudinal and in the transverse direction. The foil structure obtained by the machine according to the invention is considerably better than the foil structure obtained in a machine wherein the entire longitudinal stretching is effected in a single stage and the entire transverse stretching is also effected in a single stage.

FIGS. 3 and 4 diagrammatically show a modified stretching apparatus according to the invention. The foil 2 emerging from an extruder 1 enters a longitudinal stretching stage 23 which comprises a group of rollers 27 and a group of rollers 28 which are so arranged that the foil moves substantially vertically downward. The longitudinally stretched foil emerging at the bottom of the machine from the first longitudinal stretching stage 23 is taken over by an endless conveyor belt 30. In the illustrated example this conveyor belt has a horizontal run followed by an inclined run which extends upward to the elevation where the first transverse stretching stage 24 is arranged. The lateral edges of the foil material leaving the conveyor 30 are gripped by grippers provided on endless chains 29 which diverge in the travel direction of the foil material. These transverse stages are of the type shown in FIGS. 1 and 2 and designated by numerals 4 and 6.

As shown in FIG. 4 a platform 31 is arranged above the horizontal portion of the conveyor 30 and between the longitudial stretching stage 23 and the subsequent transverse stretching stage 24. An operator standing on the platform can easily supervise insertion of the foil to be treated into the longitudinal stretching stage 23. After correct adjustment of the longitudinal stretching stage the operator can turn around and supervise insertion of the foil material into the transverse stretching stage 24 and attend to connecting the foil to the clip chains.

The machine shown in FIG. 3 comprises a second longitudinal stretching stage 25 and a second transverse stretching stage 26. If desired, more alternating longitudinal and transverse stretching stages may be provided. It is always preferred that the last stretching stage be a transverse stretching stage followed by a thermal fixing stage 15. The last transverse stretching stage and the thermal fixing stage are arranged adjacent and close together. After leaving the apparatus the foil may be cooled by means not shown and the finished foil is wound on a roller 16.

As seen in FIG. 4 the longitudinal stretching stage comprises a group of spaced rollers 27 rotating on stationary axes and a group of spaced rollers 28 which can be laterally displaced. When inserting the foil material into the machine the rollers 28 are moved into the position shown in dotted lines in FIG. 4 providing a passage between the roller groups through which the foil can freely fall as shown by a dash-dot line. After insertion of the foil the rollers 28 are moved to the left, in FIG. 4, and between the rollers of the group 27. On top of the longitudinal stretching stage a roller 32 is provided and at the bottom of the longitudinal stretching stage a roller 33 is provided. The foil material is pressed against the rollers 32 and 33 by means of rollers 34 and 35, respectively. The rollers 32 and 33 rotate on stationary axes and the rollers 34 and 35 are movable in the horizontal direction, preferably together with the rollers of the group 28. The rollers 32 and 33 are driven in the conventional manner at different speeds to produce the desired stretching effect. The rollers 27 and 28 are freely rotatable.

Heating ducts 36 and 37 are provided on either side of the material passing through the longitudinal stretching stage and have outlet nozzles pointing towards the foil material for blowing a suitably heated gas or air against the foil material.

As said before, the conveyor 30 has a horizontal portion and an inclined or upright portion. The direction of movement of the conveyor 30 is indicated in FIG. 4 by arrows. When inserting the foil into the stretching apparatus it is of advantage to blow air against the foil for improving adhesion of the foil to the conveyor 30. For this purpose ducts 38 and 39 are provided which ducts have outlet nozzles for blowing air against the foil and the latter against the conveyor 30. Since the longitudinal stretching stage 23 and the conveyor 30 are entirely enclosed and the walls forming the enclosure may be heat-insulated, heated air may be supplied to the ducts 38 and 39 for heating the foil at least from one side while the foil is transported by the conveyor 30. The ducts 36 to 39 may be supplied from a common source of hot air or gas or, if desired, from separate sources.

The foil material leaving the conveyor 30 is preferably guided by guides 40 and 41 and a diverting roller 42 to the location where the lateral edges of the foil material can be gripped by the grippers of the gripping chain 29. During insertion the foil moves along the dash-dot line in FIG. 4. When the apparatus is in normal operation the foil follows the course shown by a solid line in FIG. 4.

Devices for supervising and controlling the longitudinal stretching device 23 may be provided on a vertical wall 43 of the device 23 which wall extends upward from the operator's platform 31. There is a wall 44 opposite the wall 43 on which devices for supervising and controlling the operation of the transverse stretching device 24 may be mounted.

An aperture normally covered by a lid or hood 45 may be provided at the location where the foil to be treated enters the transverse stretching stage 24 and is gripped by the clips of the clip chain 29. The lid 45 may be hinged to the casing of the apparatus. When the lid is in open position as shown by dash lines in FIGS. 3 and 4 the operator standing on the platform 31 can conveniently effect proper seizure of the foil by the clip chains. When the foil moves in the correct manner into and through the transverse stretching stage 24 the lid 45 is closed so that no heat is lost. Similar apertures and lids or covers may be provided at the top or inlet of the vertical, longitudinal stretching stages 23 and 25, as shown in FIG. 3.

In the illustrated example transport devices are provided for transporting the foil to be treated from the lower end of the longitudinal stretching stages to the inlet of the horizontal, transverse stretching stages. Transport devices may be provided for transferring the foil to be treated from the transverse stretching stages to the subsequent longitudinal stretching stages so that the top and inlet of the longitudinal stretching stage may be at a higher elevation than the elevation of the outlet of the transverse stretching stage. In this modification the individual longitudinal stretching stages may be placed considerably higher than in the example shown in FIGS. 3 and 4. Since the longitudinal stretching stages are substantially vertical also in the last described modification, the foil can be inserted by simply letting it drop between two groups of rollers as described before. In the last described modification the clip chains of the transverse stretching stages may be arranged in an inclined plane for conducting the foil to the elevation of the inlet of the subsequent longitudinal stretching stage. In this case there is no need for providing a special transport device between the outlet of the transverse stretching stage and the subsequent longitudinal stretching stage.

I claim:

1. An apparatus for longitudinally and transversely stretching thermoplastic foil material in a continuous operation, comprising:
   at least two devices for longitudinally stretching the foil material to a predetermined total extent, each device longitudinally stretching the foil material to a fraction of said predetermined total extent,
   at least two devices for transversely stretching the foil material to a predetermined total extent, each of said last mentioned devices transversely stretching the foil material to a fraction of said predetermined total extent of transverse stretching,
   said devices being alternately and consecutively placed with respect to the travel direction of the foil material,
   means for passing the foil material continuously and consecutively through said devices for alternately and repeatedly stretching the foil material in the longitudinal direction and in the transverse direction,
   said devices for longitudinally stretching the foil material being placed substantially vertically and the foil material passing therethrough in a downward direction,
   the foil material outlets of said longitudinal stretching devices being spaced from the foil material inlets of the subsequent transverse stretching devices, and
   foil material transport means interposed between the foil material outlet of a longitudinal stretching device and the foil material inlet of a transverse stretching device consecutively passed by the foil material for transporting the foil material from the longitudinal stretching device to the transverse stretching device subsequently passed by the foil material.

2. An apparatus as defined in claim 1, wherein said transport means is encased in a heat-tight casing.

3. An apparatus according to claim 1 including means adjacent to said transport means for heating the foil material while it is transported.

4. An apparatus as defined in claim 1 including communicating casing means for said devices and for said transport means, and heating means for heating the interior of said casing means.

5. An apparatus for longitudinally and transversely stretching thermoplastic foil material in a continuous operation, comprising:
   at least two devices for longitudinally stretching the foil material,
   at least two devices for transversely stretching the foil material,
   said devices being alternately placed in a line to form a unitary apparatus,
   means for passing the foil material continuously and consecutively through said devices for alternately and repeatedly stretching the foil material in the longitudinal direction and in the transverse direction,
   said devices for longitudinally stretching the foil material being placed substantially vertically and the foil material passing therethrough in a downward direction from an inlet to an outlet,
   the foil material inlets of said devices for transversely stretching the foil material being placed at an elevation higher than the outlets of said devices for longitudinally stretching the foil material,
   foil material transport means interposed between each of said devices for longitudinally stretching the foil material and the device for transversely stretching the foil material and subsequently passed by the foil material,
   each of said transport means having a substantially horizontal portion at substantially the elevation of the outlets of said devices for longitudinally stretching the foil material, and
   an operator's platform placed above said substantially horizontal portion of said transport means to afford standing of the operator between one of said devices for longitudinally stretching the foil material and the device for transversely stretching the foil material and subsequently passed by the foil material.

6. An apparatus for longitudinally and transversely stretching thermoplastic foil material in a continuous operation, comprising:
   at least two devices for longitudinally stretching the foil material,
   at least two devices for transversely stretching the foil material,
   said devices being alternately placed in a line to form a unitary apparatus, and
   means for passing the foil material continuously and consecutively through said devices for alternately and repeatedly stretching the foil material in the longitudinal direction and in the transverse direction,
   said devices for longitudinally stretching the foil material being placed substantially vertically and the foil material passing therethrough in a downward direction, each of said longitudinal stretching devices including a first group of spaced horizontal rollers whose rotation axes are in a substantially vertical plane, and a second group of spaced horizontal rollers whose rotation axes are also in a substantially vertical plane, said second group of rollers being laterally movable for movement into the spaces between the rollers of the first group for normal operation of said devices for longitudinally stretching the foil material and for movement away from the first group of rollers for affording vertical dropping of the foil material between said two groups of rollers when the apparatus is prepared for operation.

7. An apparatus for longitudinally and transversely stretching thermoplastic foil material in a continuous operation, comprising:
 at least two devices for longitudinally stretching the foil material,
 at least two devices for transversely stretching the foil material,
 said devices being alternately and consecutively placed with respect to the travel direction of the foil material,
 means for passing the foil material continuously and consecutively through said devices for alternately and repeatedly stretching the foil material in the longitudinal direction and in the transverse direction,
 said devices for longitudinally stretching the foil material being placed substantially vertically and the foil material passing therethrough in a downward direction,
 an endless conveyor belt interposed between two stretching devices consecutively passed by the foil material for transporting the foil material from one device to the device which is subsequently passed by the foil material, and
 means for blowing the foil material onto said conveyor belt for increasing adhesion of the foil material to said conveyor belt.

8. An apparatus for longitudinally and transversely stretching thermoplastic foil material in a continuous operation, comprising:
 at least two devices for longitudinally stretching the foil material,
 at least two devices for transversely stretching the foil material,
 said devices being alternately and consecutively placed with respect to the travel direction of the foil material,
 means for passing the foil material continuously and consecutively through said devices for alternately and repeatedly stretching the foil material in the longitudinal direction and in the transverse direction,
 said devices for longitudinally stretching the foil material being placed substantially vertically and the foil material passing therethrough in a downward direction,
 an endless conveyor belt interposed between two stretching devices consecutively passed by the foil material for transporting the foil material from one device to the device which is subsequently passed by the foil material, and
 means for blowing heated air against the foil material for heating the latter and for blowing the foil material onto said conveyor belt for increasing adhesion of the foil material to said conveyor belt.

References Cited by the Examiner

UNITED STATES PATENTS

| | | | |
|---|---|---|---|
| 2,321,635 | 6/43 | Taylor | 18—1 |
| 2,473,404 | 6/49 | Young | 18—1 |
| 2,627,088 | 2/53 | Alles et al. | |
| 2,668,988 | 2/54 | Bailey et al. | |
| 2,698,967 | 1/55 | Reichel et al. | |
| 2,728,941 | 1/56 | Alles et al. | 18—1 |
| 2,823,421 | 2/58 | Scarlett. | |
| 2,866,231 | 12/58 | Vaughan. | |
| 3,004,284 | 10/61 | Limbach | 18—1 |

WILLIAM J. STEPHENSON, *Primary Examiner.*